(12) United States Patent
Kowalski

(10) Patent No.: US 9,731,658 B2
(45) Date of Patent: Aug. 15, 2017

(54) LIFTGATE CARGO MODULE

(71) Applicant: Magna International Inc., Aurora (CA)

(72) Inventor: Steven M. Kowalski, Royal Oak, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 15/108,955

(22) PCT Filed: Jan. 9, 2015

(86) PCT No.: PCT/US2015/010791
§ 371 (c)(1),
(2) Date: Jun. 29, 2016

(87) PCT Pub. No.: WO2015/106082
PCT Pub. Date: Jul. 16, 2015

(65) Prior Publication Data
US 2016/0318453 A1 Nov. 3, 2016

Related U.S. Application Data

(60) Provisional application No. 61/925,424, filed on Jan. 9, 2014.

(51) Int. Cl.
*B60R 5/04* (2006.01)
*B60R 9/06* (2006.01)
(Continued)

(52) U.S. Cl.
CPC ............ *B60R 9/06* (2013.01); *B60J 5/104* (2013.01); *B60J 5/107* (2013.01); *B60Q 1/34* (2013.01);
(Continued)

(58) Field of Classification Search
CPC .................... B60R 5/04; B60R 5/041
See application file for complete search history.

(56) References Cited

U.S. PATENT DOCUMENTS 5,758,392 A * 6/1998 Anscher ............. B60R 7/005
24/599.9
6,799,873 B2 * 10/2004 Fox ..................... B60Q 1/44
362/485
(Continued)

FOREIGN PATENT DOCUMENTS

AT 007260 U1 12/2004
DE 102005002203 A1 7/2006
(Continued)

OTHER PUBLICATIONS

International Search Report for International Application No. PCT/US2015/010791.

*Primary Examiner* — John Walters
*Assistant Examiner* — James Triggs
(74) *Attorney, Agent, or Firm* — Warn Partners, P.C.

(57) ABSTRACT

A liftgate cargo module having an integrated tailgate that unfolds from a hatch or liftgate of a vehicle that adds additional storage and provides a cargo load floor. When unfolded, there is an integrated pass through door formed in the hatch or liftgate permitting longer items to be hauled, while keeping the hatch or liftgate completely closed. The integrated tailgate includes an integrated tailgate taillight that indicates when the vehicle is braking or backing up. The integrated tailgate taillight also helps to show that the integrated tailgate is folded down from and extending from the hatch or liftgate of the vehicle. The integrated tailgate also includes integrated anchor points formed on the cargo load floor so items may be tied down and secured. An all-weather enclosure that is connectable to the cargo load (Continued)

floor for enclosing contents that are being hauled on the integrated tailgate may also be provided.

12 Claims, 5 Drawing Sheets

(51) Int. Cl.
    *B60J 5/10*     (2006.01)
    *B60R 9/042*     (2006.01)
    *B60Q 1/34*     (2006.01)
    *B60Q 1/44*     (2006.01)
    *B60R 13/10*     (2006.01)

(52) U.S. Cl.
    CPC ................ *B60Q 1/44* (2013.01); *B60R 5/041* (2013.01); *B60R 9/042* (2013.01); *B60R 9/065* (2013.01); *B60R 13/105* (2013.01)

(56) References Cited

U.S. PATENT DOCUMENTS

| | | | | |
|---|---|---|---|---|
| 7,543,875 B2 * | 6/2009 | Leopold | ................ | B60R 5/041 |
| | | | | 296/146.8 |
| 8,408,626 B1 * | 4/2013 | Herndon | ................ | B60R 5/042 |
| | | | | 296/180.1 |
| 2012/0061985 A1 | 3/2012 | Parker | | |

FOREIGN PATENT DOCUMENTS

| | | | |
|---|---|---|---|
| DE | 102007039199 A1 | 12/2008 | |
| DE | 102011121324 A1 | 6/2012 | |
| EP | 1028016 A1 | 8/2000 | |
| EP | 1977930 A2 | 10/2008 | |
| FR | EP 1028016 A1 * | 8/2000 | .............. B60J 5/101 |

* cited by examiner

LIFTGATE CARGO MODULE

CROSS-REFERENCE TO RELATED APPLICATIONS

This application is a National Stage of International Application No. PCT/US2015/010791, filed Jan. 9, 2015. This application claims the benefit of U.S. Provisional Application No. 61/925,424, filed Jan. 9, 2014. The disclosure(s) of the above application(s) is (are) incorporated herein by reference.

FIELD OF THE INVENTION

The present invention relates to an integrated tailgate that unfolds from a hatch or liftgate in order to form a liftgate cargo module.

BACKGROUND OF THE INVENTION

In order to haul larger or longer items that extend beyond the cargo area of a vehicle, typically a hatch or liftgate must be kept open or tied shut while the longer item extends beyond the cargo area of the vehicle. Different systems have been developed that extend or allow longer items to be hauled. For example, roof racks for hauling longer items such as kayaks, bicycles, snow skis or luggage have been developed. Additionally, racks that connect to trunks and trailer hitches have also been developed for carrying larger or longer items. However, these different structures are typically add-on structures that are connected or mounted to the vehicle and are not necessarily part of or integral with the vehicle. It is therefore desirable to develop a modified hatch or liftgate that allows items to be loaded through a pass-through door and are loaded or secured on an integrated tailgate style door that eliminates the need for add-on items and also allow for longer items to be passed through the interior cargo space and extend through a hatch to the exterior of the vehicle.

SUMMARY OF THE INVENTION

The present invention relates to a liftgate cargo module having an integrated tailgate that unfolds from a hatch or liftgate of a vehicle. The integrated tailgate adds additional storage and provides a cargo load floor. When the integrated hatch is unfolded there is an integrated pass through door formed in the hatch or liftgate that permits longer items to be hauled, while keeping the hatch or liftgate completely closed. The integrated tailgate also includes an integrated tailgate taillight that indicates when the vehicle is braking or backing up. The integrated tailgate taillight also helps to show that the integrated tailgate is folded down from and extending from the hatch or liftgate of the vehicle. Additionally, the integrated tailgate also includes integrated anchor points formed on the cargo load floor of the integrated tailgate that allow for items to be tied down and secured. In an optional embodiment of the invention, an all-weather enclosure is connectable to the cargo load floor for enclosing contents that are being hauled on the integrated tailgate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
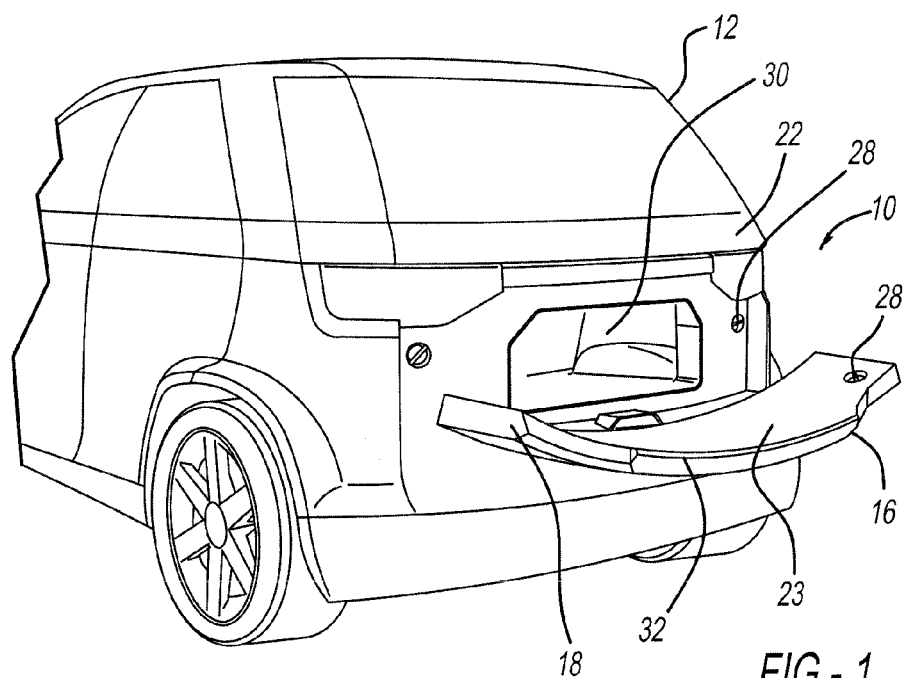
FIG. 1 is a rear perspective view of a vehicle liftgate having a liftgate cargo module installed wherein the integrated tailgate is in the deployed position.
Figure 2:
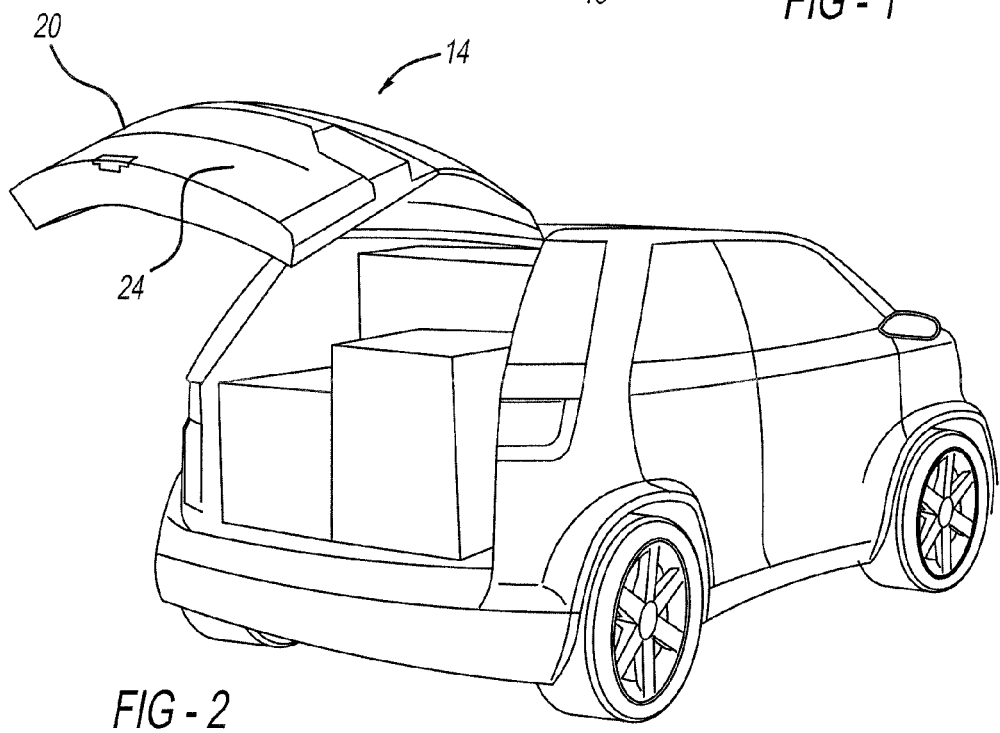
FIG. 2 is a rear perspective view of a vehicle tailgate having the integrated tailgate in an un-deployed position.
Figure 3:
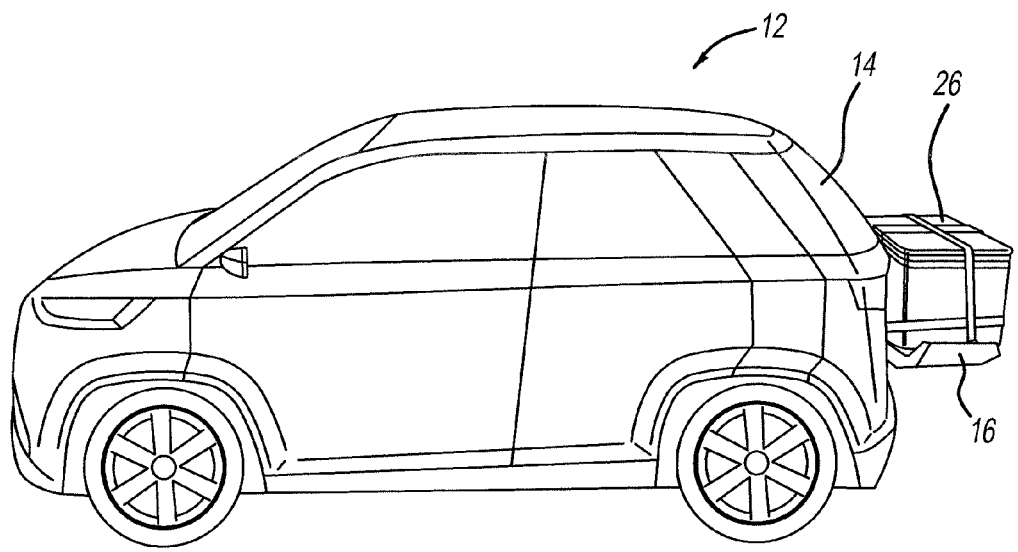
FIG. 3 is a side perspective view of a vehicle having a deployed tailgate with an item attached.
Figure 4:
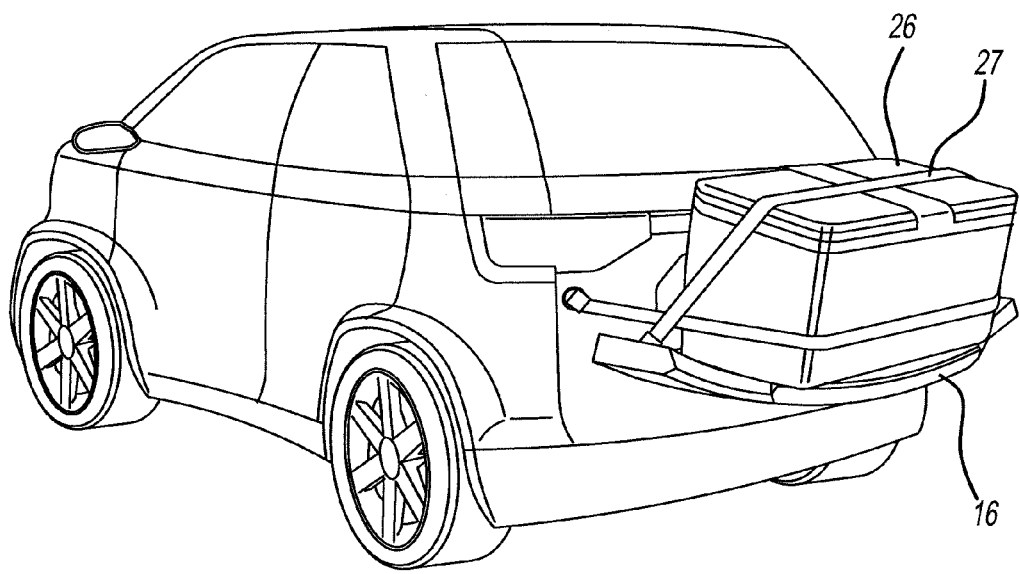
FIG. 4 is a rear perspective view of a vehicle having a deployed tailgate with an item attached.
Figure 5:
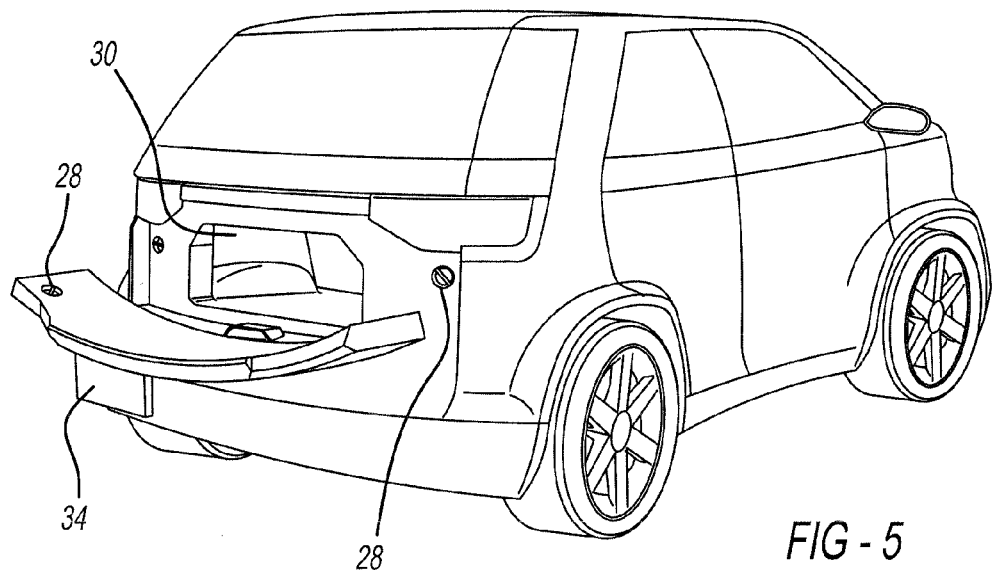
FIG. 5 is a rear perspective view of a vehicle having a deployed tailgate with the pass through door open.
Figure 6:
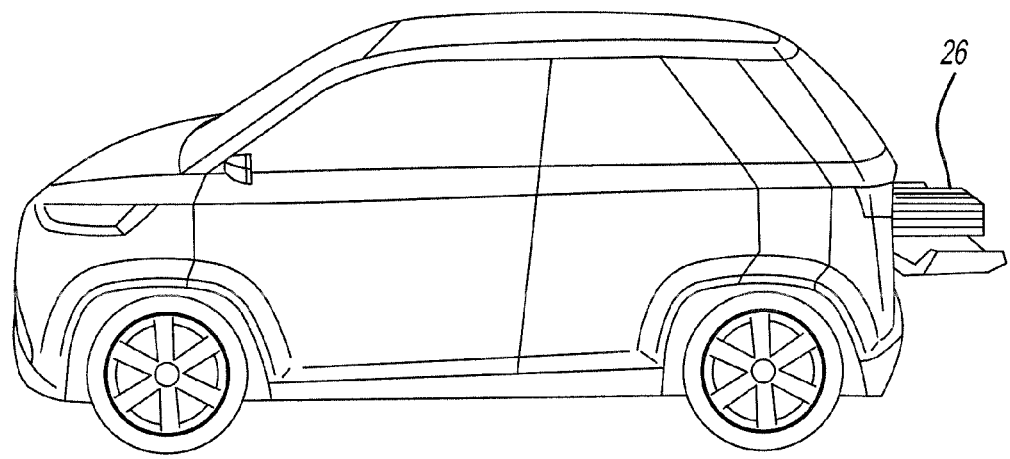
FIG. 6 is a side perspective view of a vehicle having a deployed tailgate with the pass through door open and oversized items extending through the pass through door.
Figure 7:
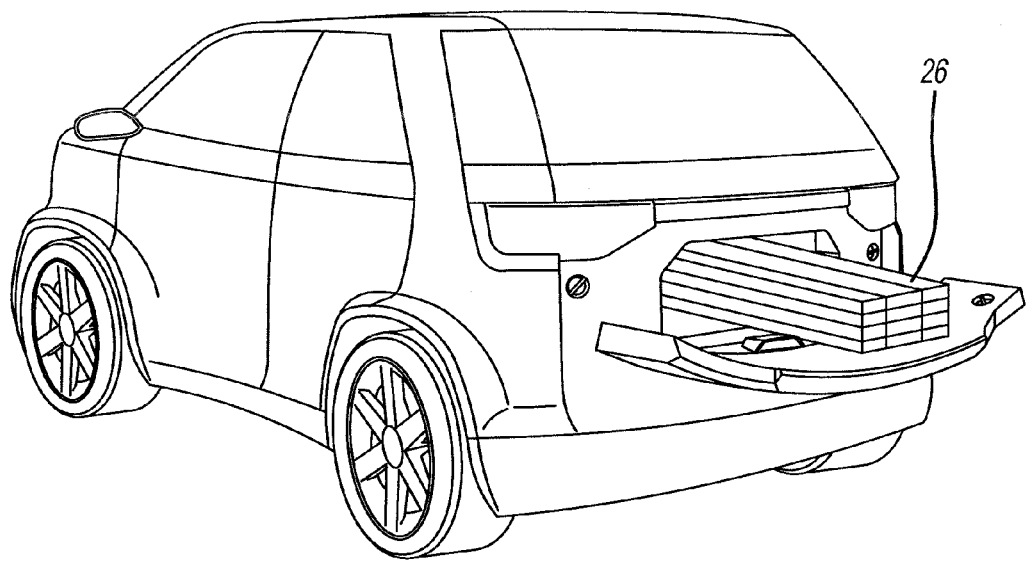
FIG. 7 is a rear perspective view of a vehicle having a deployed tailgate with the pass through door open and oversized items extending through the pass through door.

The following description of the preferred embodiment(s) is merely exemplary in nature and is in no way intended to limit the invention, its application, or uses.

Referring now to all of the drawings generally, a liftgate cargo module arrangement 10 is shown being connected to a vehicle 12 having an outside panel 14. The outside panel 14 has an integrated tailgate 16 connected which serves as a cargo holder for the liftgate cargo module arrangement 10 depicted in the present embodiment of the present invention. The integrated tailgate 16 connects to the outside panel 14 and pivots between a deployed position 18 and an un-deployed position 20. The outside panel 14 has exterior surface 22 that is continuous with an exterior surface 24 of the integrated tailgate 16 when the integrated tailgate 16 is in the un-deployed position 20. This allows for the integrated tailgate 16 to be hidden or appear to be part of the vehicle 12 outside panel 14 when in the un-deployed position since the exterior surface 22 of the outside panel 14 will be smooth and continuous with the exterior surface 24 of the integrated tailgate 16.

When the integrated tailgate 16 is in the deployed position 18, a cargo load floor 23 of the integrated tailgate 16 is accessible and can be used for holding items 26 that are to be stowed using the integrated tailgate 16. The item(s) 26 can rest on the cargo load floor 23 and can be connected or tied down using a rope, chain, cable or bungee cord 27 connected between anchor points 28 formed on the surface of the cargo load floor 23 and vehicle 12.

In certain embodiments, items 26 may be long or too large to be stowed only on the cargo load floor 23. In another aspect of the invention, the outside panel 14 has a pass through door 30 that is adjacent the cargo load floor 23 for allowing an item(s) 26 to extend from the cargo load floor 23 on the outside of the vehicle 12 through the pass through door 30, into the interior of the vehicle 12. This is suitable for longer items such as skis, pieces of wood or any other larger item that cannot be stowed in the interior of the vehicle 12, without extending past the vehicle interior to the outside of the vehicle 12.

In another aspect of the invention, the integrated tailgate 16 has an integrated taillight 32 that can be illuminated when the vehicle is driving at night, turning, braking or backing up in order to signal other vehicles and persons in the area. In another aspect of the invention, the integrated tailgate 16 has a license plate holder 34 that is connected to the integrated tailgate 16 or pivotally connected to the exterior surface 22 of the integrated tailgate 16 so that the license plate holder 34 moves or pivots relative to the exterior surface 22 and be seen when the integrated tailgate 16 is in the deployed position 18.

Figure 8:
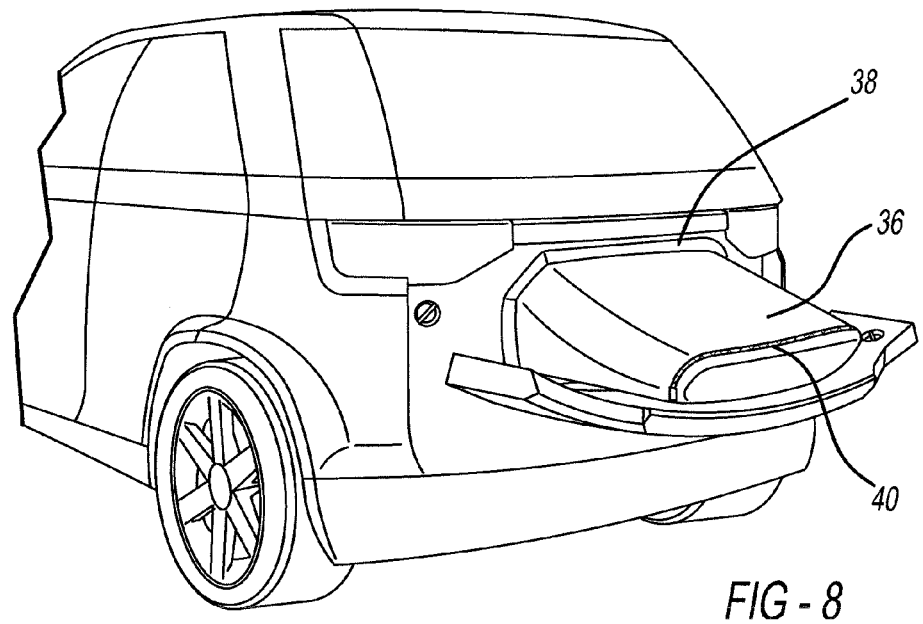
FIG. 8 is a rear perspective view of a vehicle tailgate with the integrated tailgate in the deployed position and a soft enclosure for enclosing items on the cargo load floor of the integrated tailgate.
Figure 9:
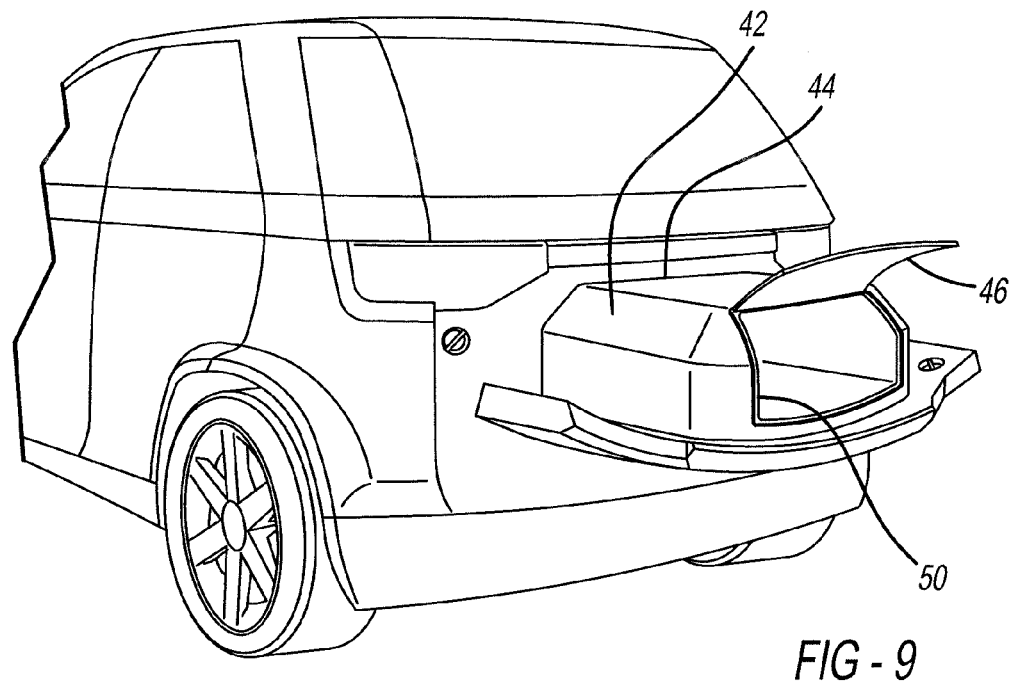
FIG. 9 is a rear perspective view of a vehicle tailgate with the integrated tailgate in the deployed position and a hard enclosure with a moveable door for enclosing items on the cargo load floor of the integrated tailgate.
Figure 10:
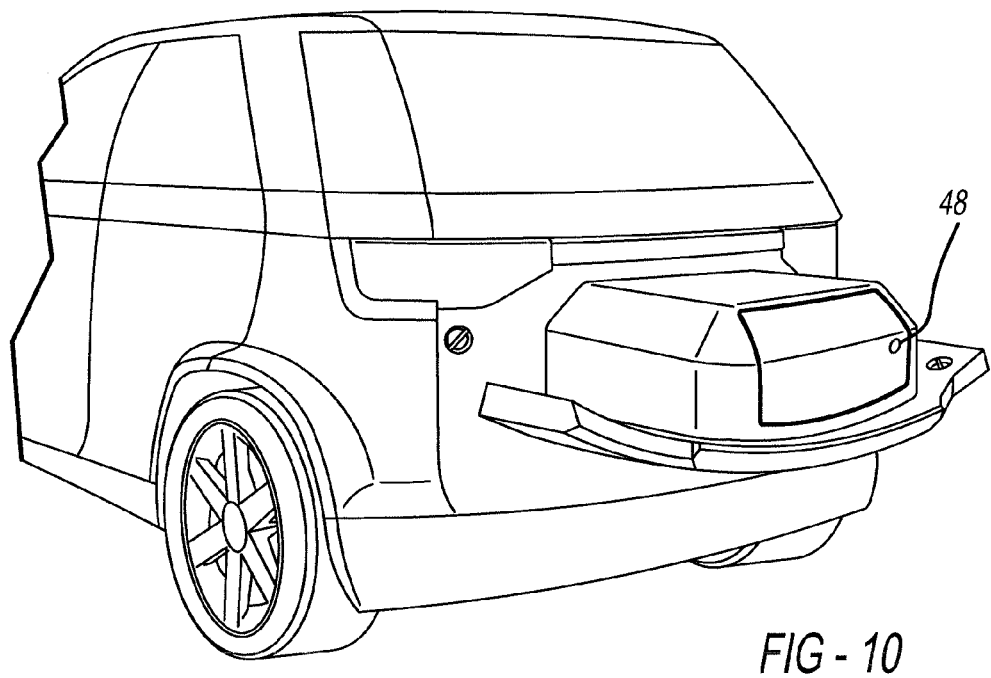
FIG. 10 is a rear perspective view of a vehicle tailgate with the integrated tailgate in the deployed position and a hard enclosure with a locking door for enclosing items on the cargo load floor of the integrated tailgate.

Referring now to FIG. 8, an additional aspect of the invention is shown which includes a soft all-weather enclosure 36 that is configured to connect to the integrated tailgate 16 and cover the cargo load floor 24 for protecting items 26 from being exposed to the outside elements. The all-weather enclosure 36 in the present embodiment of the invention is a soft material that connects to the outside panel 14 of the vehicle using a fastener 38 such as a zipper, buttons or Velcro® in order to cover or enclose the area of the pass through door 30. Additionally, the all-weather enclosure 36 includes an aperture 40 that has a zipper, Velcro® or other fastener that allows for accessing the items 26 inside of the all-weather closure 36 from the outside of the vehicle. FIGS. 9 and 10 show an alternate embodiment of an all-weather enclosure 42 that is a hard enclosure 42 having a fastener 44 for connecting the hard enclosure 42 to the outside panel 14 of the vehicle 12. The hard enclosure 42 has a door 46 that can be moved between an open and closed position allowing access to the items 26 within the hard enclosure 42. Additionally, the door 46 of the hard enclosure 42 has a lock 48 for locking the door in place and has seals 50 for preventing moisture from getting inside of the hard enclosure 42.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A liftgate cargo module comprising:
    an outside panel forming a liftgate of a vehicle, the outside panel being moveable between an open position and a closed position;
    an integrated tailgate forming part of and is connected to said outside panel, said integrated tailgate is movable between a deployed position and an undeployed position wherein the integrated tailgate when in the undeployed position forms an exterior surface of the outside panel of the vehicle;
    a cargo load floor of the integrated tailgate that is accessible when the integrated tailgate is in the deployed position, wherein the cargo load floor is used for holding one or more items such that the one or more items rest on the cargo load floor;
    an all-weather enclosure that is a hard enclosure having a fastener for connecting the hard enclosure to the outside panel of the vehicle, wherein the hard enclosure includes a door that is moveable between an open and closed position, the door includes a lock for locking the door in the closed position and seals for preventing moisture from getting inside of the hard enclosure.

2. The liftgate cargo module of claim 1 further comprising an integrated pass through door formed through the outside panel of the vehicle behind the integrated tailgate, wherein the integrated pass through door is exposed when the integrated tailgate is in the deployed position and allows for items having a length greater than the cargo area to be hauled while keeping the outside panel of the vehicle closed.

3. The liftgate cargo module of claim 1 further comprising an integrated tailgate taillight connected to the integrated tailgate that indicates whether the vehicle is braking or backing up.

4. The liftgate cargo module of claim 1 further comprising integrated anchor points formed on the cargo load floor of the integrated tailgate allowing items to be tied down and secured.

5. The liftgate cargo module of claim 1 further comprising a license plate holder connected to the integrated tailgate for displaying the license plate.

6. The liftgate cargo module of claim 5 wherein the license plate holder is pivotably connected to an exterior surface of the integrated tailgate so that the license plate holder moves or pivots relative to the exterior surface and can be seen when the integrated tailgate is in the deployed position.

7. A liftgate cargo module comprising:
    an integrated tailgate that unfolds from a hatch or liftgate to add additional storage and provide a cargo load floor, wherein the hatch or liftgate has an outside panel and the integrated tailgate forms part of and is connected to the outside panel and the integrated tailgate is moveable between a deployed position and an undeployed position wherein the integrated tailgate when in the undeployed position forms an exterior surface of the outside panel of the vehicle;
    a cargo load floor of the integrated tailgate that is accessible when the integrated tailgate is in the deployed position, wherein the cargo load floor is used for holding one or more items such that the one or more items rest on the cargo load floor;
    an integrated pass through door formed in the hatch or liftgate that permits items having a length greater than the cargo area to be hauled while keeping the hatch or liftgate completely closed;
    an integrated tailgate taillight connected to the integrated tailgate that indicates whether the vehicle is braking or backing up;
    integrated anchor points formed on the cargo load floor of the integrated tailgate allowing for items to be tied down and secured; and
    an all-weather enclosure that is a hard enclosure having a fastener for connecting the hard enclosure to the outside panel of the vehicle, wherein the hard enclosure includes a door that is moveable between an open and closed position, the door includes a lock for locking the door in the closed position and seals for preventing moisture from getting inside of the hard enclosure.

8. The liftgate cargo module of claim 7 further comprising a license plate holder connected to the integrated tailgate for displaying the license plate.

9. The liftgate cargo module of claim 8 wherein the license plate holder is pivotably connected to an exterior surface of the integrated tailgate so that the license plate holder moves or pivots relative to the exterior surface and can be seen when the integrated tailgate is in the deployed position.

10. A liftgate cargo module comprising:
- an integrated tailgate that unfolds from a hatch or liftgate to add additional storage and provide a cargo load floor, wherein the hatch or liftgate has an outside panel and the integrated tailgate forms part of and is connected to the outside panel and the integrated tailgate is moveable between a deployed position and an undeployed position wherein the integrated tailgate when in the undeployed position forms an exterior surface of the outside panel of the vehicle;
- a cargo load floor of the integrated tailgate that is accessible when the integrated tailgate is in the deployed position, wherein the cargo load floor is used for holding one or more items such that the one or more items rest on the cargo load floor;
- an integrated pass through door formed in the hatch or liftgate that permits items having a length greater than the cargo area to be hauled while keeping the hatch or liftgate completely closed;
- an integrated tailgate taillight connected to the integrated tailgate that indicates whether the vehicle is braking or backing up; and
- an all-weather enclosure connectable to the cargo load floor for enclosing contents that are being hauled on the integrated tailgate, wherein the all-weather enclosure includes a hard enclosure having a fastener for connecting the hard enclosure to the outside panel of the vehicle, wherein the hard all-weather enclosure has a door that is movable between an open and closed position allowing access to the interior of the hard enclosure, the door includes a lock for locking the door in the closed position and seals for preventing moisture from getting inside of the hard enclosure.

11. The liftgate cargo module of claim 10 further comprising a license plate holder connected to the integrated tailgate for displaying the license plate.

12. The liftgate cargo module of claim 11 wherein the license plate holder is pivotably connected to an exterior surface of the integrated tailgate so that the license plate holder moves or pivots relative to the exterior surface and can be seen when the integrated tailgate is in the deployed position.

* * * * *